United States Patent
Baseggio et al.

(10) Patent No.: US 11,746,809 B2
(45) Date of Patent: Sep. 5, 2023

(54) CONNECTION DEVICE FOR INTERCONNECTING TWO COMPONENTS MADE OF PLASTICS MATERIAL

(71) Applicant: DENSO THERMAL SYSTEMS S.p.A., Poirino (IT)

(72) Inventors: Daniele Baseggio, Poirino (IT); Luca Bergamo, Poirino (IT)

(73) Assignee: DENSO THERMAL SYSTEMS S.P.A., Poirino (IT)

( * ) Notice: Subject to any disclaimer, the term of this patent is extended or adjusted under 35 U.S.C. 154(b) by 483 days.

(21) Appl. No.: 16/880,874

(22) Filed: May 21, 2020

(65) Prior Publication Data

US 2020/0370577 A1 Nov. 26, 2020

(30) Foreign Application Priority Data

May 22, 2019 (IT) .................. 102019000007091

(51) Int. Cl.
*F16B 5/00* (2006.01)
*F16B 5/06* (2006.01)
*B60H 1/00* (2006.01)

(52) U.S. Cl.
CPC ....... *F16B 5/0016* (2013.01); *B60H 1/00528* (2013.01); *F16B 5/0635* (2013.01);
(Continued)

(58) Field of Classification Search
CPC .............. B60H 1/00528; F28F 2275/14; F28F 2275/143; F28F 2275/085; F16B 5/0012; F16B 5/0016; Y10T 403/16
See application file for complete search history.

(56) References Cited

U.S. PATENT DOCUMENTS 4,080,742 A 3/1978 Osterried
4,541,036 A * 9/1985 Landries ............... H02B 1/048
220/3.6

(Continued)

FOREIGN PATENT DOCUMENTS

DE 2549185 A1 5/1976
DE 102006033580 A1 2/2008
DE 102017204600 A1 9/2018

OTHER PUBLICATIONS

Italian Search Report and Written Opinion for IT Patent Application No. 201900007091, Jan. 17, 2020, 7 pages.

*Primary Examiner* — Michael P Ferguson
(74) *Attorney, Agent, or Firm* — Armstrong Teasdale LLP (57) ABSTRACT

A connection device for interconnecting two components of plastics material is provided. The components include a first wall and a second wall, which have respective edges arranged against one another, when the two components are assembled. The device includes at least one clip on the first wall and extending beyond the edge thereof, at least one first tooth and at least one second tooth on the second wall and designed to be snap engaged by the clip when the two components are in the pre-assembled state and in the assembled state, respectively. The first tooth is closer than the second tooth to the edge of the second wall such that, when pre-assembled, the two components are connected by the edges of the first wall and the second wall, the edges being spaced apart from one another. The first tooth has an inclined locking face for facilitating decoupling of the two components.

7 Claims, 6 Drawing Sheets

(52) U.S. Cl.
CPC ........ *F16B 5/0664* (2013.01); *F16B 2200/10* (2018.08); *F28F 2275/085* (2013.01); *F28F 2275/143* (2013.01)

(56) References Cited

U.S. PATENT DOCUMENTS

| | | | |
|---|---|---|---|
| 5,551,589 | A | 9/1996 | Nakamura |
| 5,699,601 | A | 12/1997 | Gilliam et al. |
| 6,213,077 | B1 * | 4/2001 | Horii ................ F02M 35/1283 123/184.57 |
| 8,943,655 | B2 * | 2/2015 | Kabeya ................ F16B 5/0657 24/453 |
| 9,676,297 | B2 * | 6/2017 | Peniche ............... B60N 2/0725 |
| 2011/0017742 | A1 * | 1/2011 | Sausen ............... B60H 1/00528 403/345 |
| 2016/0204400 | A1 | 7/2016 | Baek et al. |
| 2017/0350433 | A1 | 12/2017 | Hwan |
| 2020/0068723 | A1 | 2/2020 | Miklosi |

* cited by examiner

CONNECTION DEVICE FOR INTERCONNECTING TWO COMPONENTS MADE OF PLASTICS MATERIAL

CROSS-REFERENCE TO RELATED APPLICATION

This application claims priority to and benefit of Italian Patent Application No. 102019000007091, filed May 22, 2019, the contents of which are incorporated by reference in their entirety.

FIELD OF THE INVENTION

The present invention relates to procedures of assembling components made of plastics material.

BACKGROUND OF THE INVENTION

A difficulty consists in keeping two plastics pieces in shape after a molding cycle so as to prevent deformations that could create problems during subsequent assembly steps.

SUMMARY OF THE INVENTION

An object of the present invention is to provide a solution to the above problem.

Accordingly, the present invention provides a connection device for interconnecting two components made of plastics material, said components comprising respectively a first wall and a second wall, which have respective edges that, when the two components are assembled, are arranged one against the other,
wherein said connection device comprises
at least one clip arranged on the first wall and extending beyond the edge of the first wall,
at least one first tooth and at least one second tooth arranged on the second wall and designed to be snap engaged by the clip when the two components are in the assembled state and in the pre-assembled state, respectively, said first tooth being closer than the second tooth to the edge of the second wall such that, in the pre-assembled state, the two components are connected to one another by the edges of the first wall and of the second wall that are spaced apart from one another, said first tooth comprising an invite outlet face for facilitating decoupling of the two components from the pre-assembled state.

According to the present invention, at least one additional locking tooth (the first tooth) is formed between the two components and is made so as to pre-assemble the two components in a first step (that is, when the components are taken from the molding cycle and are still hot) and to disassemble them in a second step (when the components have cooled down) in order to finally assemble them in a third step. This allows the two components to cool down together and not to deform and create problems during the final assembly step.

Additional features and advantages of the connection device according to the present invention will become more apparent by reference to the following detailed description of one embodiment of the invention, taken in conjunction with the accompanying drawings provided purely by way of non-limiting example.

DETAILED DESCRIPTION

Figure 1:
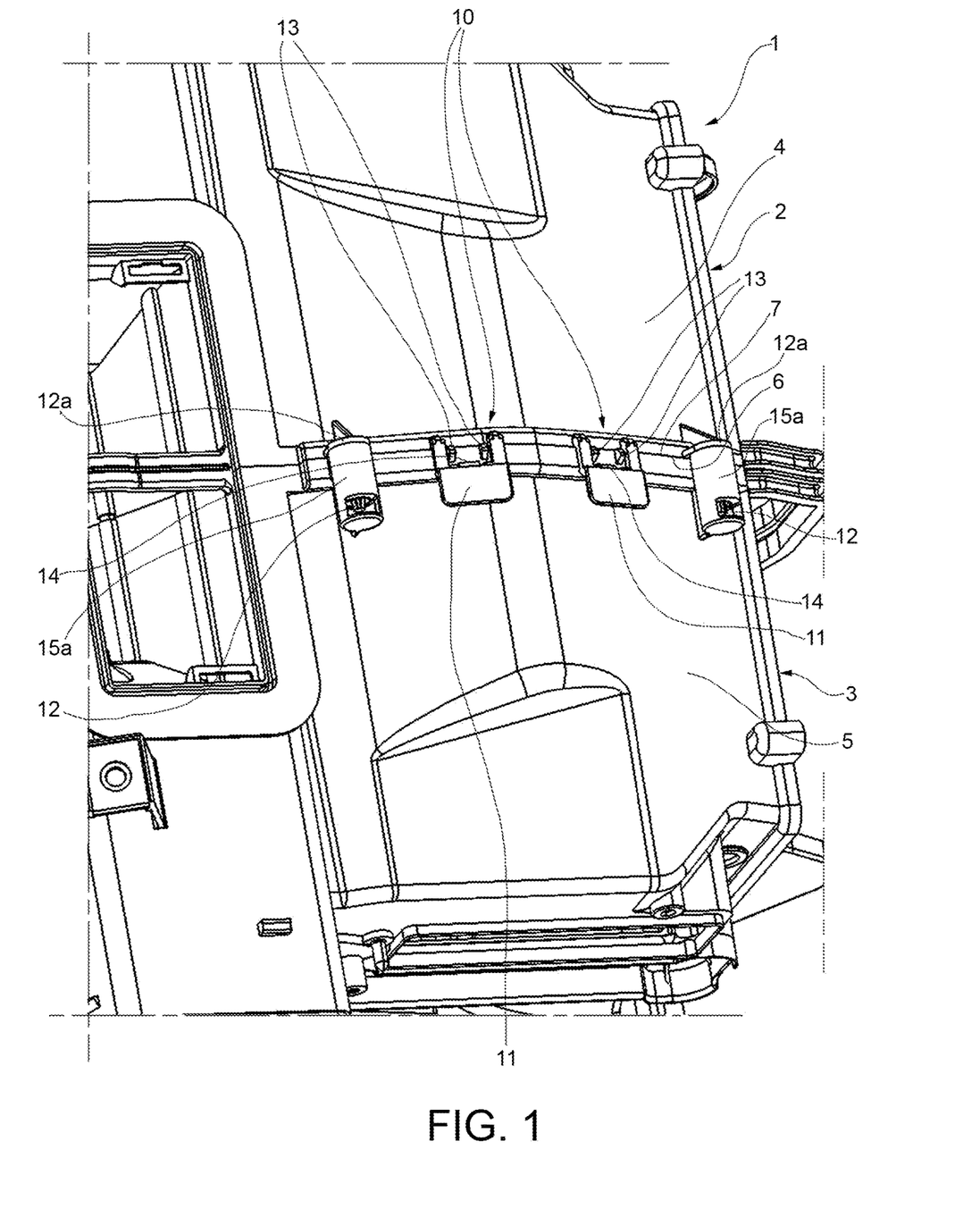
FIG. 1 is a partial view of a housing provided with the connection device according to the present invention.
Figure 2:
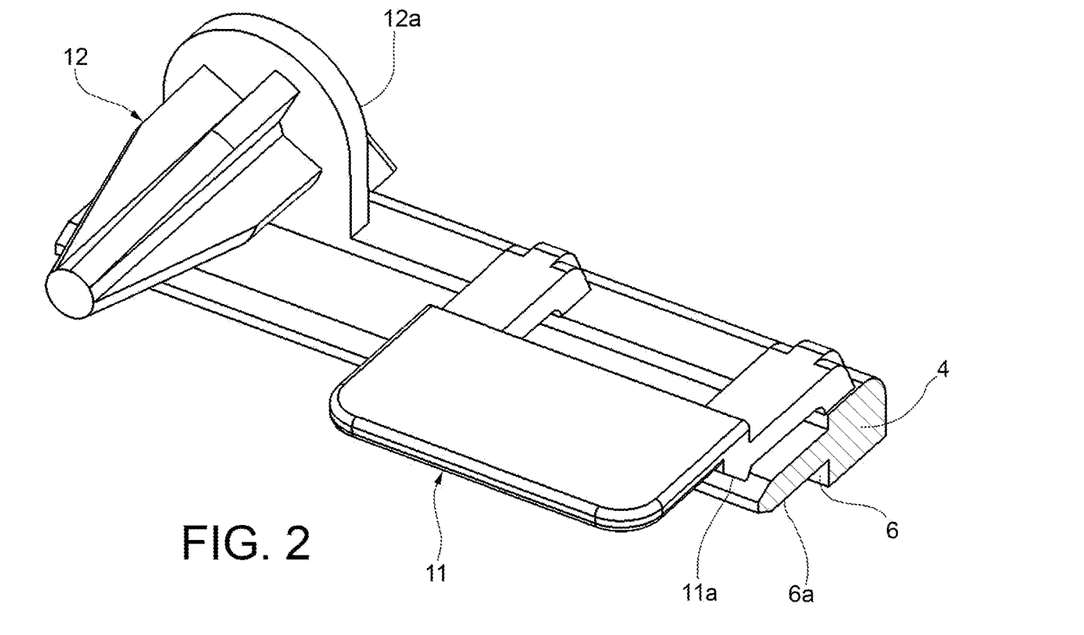
FIGS. 2 to 4 are perspective views of a first part of the connection device according to the present invention.
Figure 3:
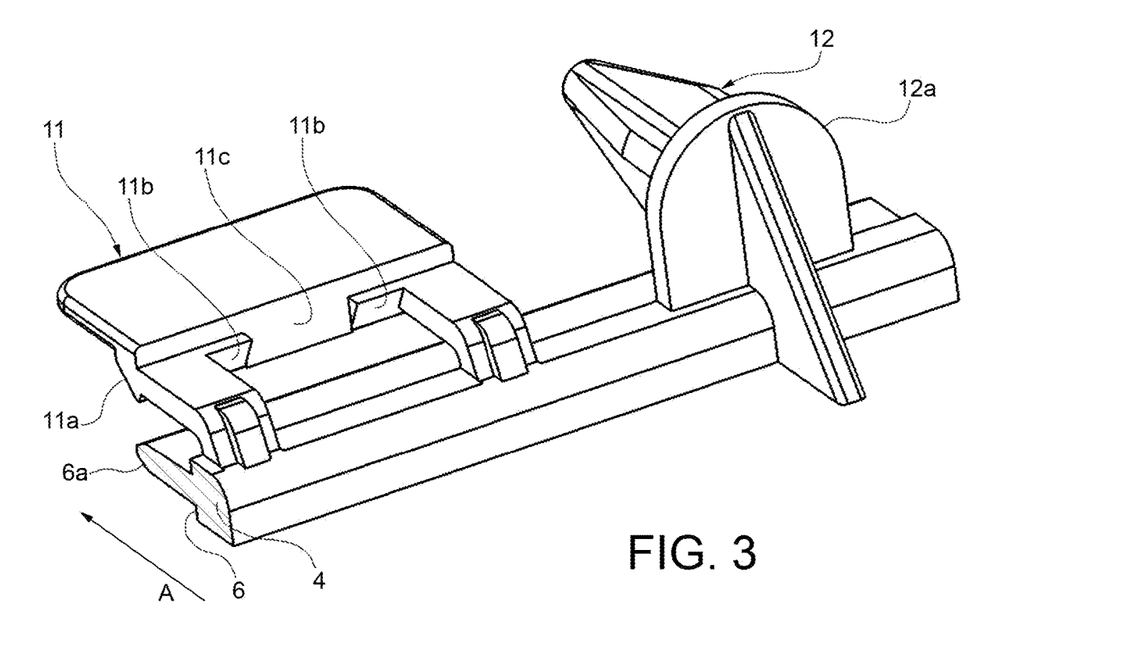
Figure 4:
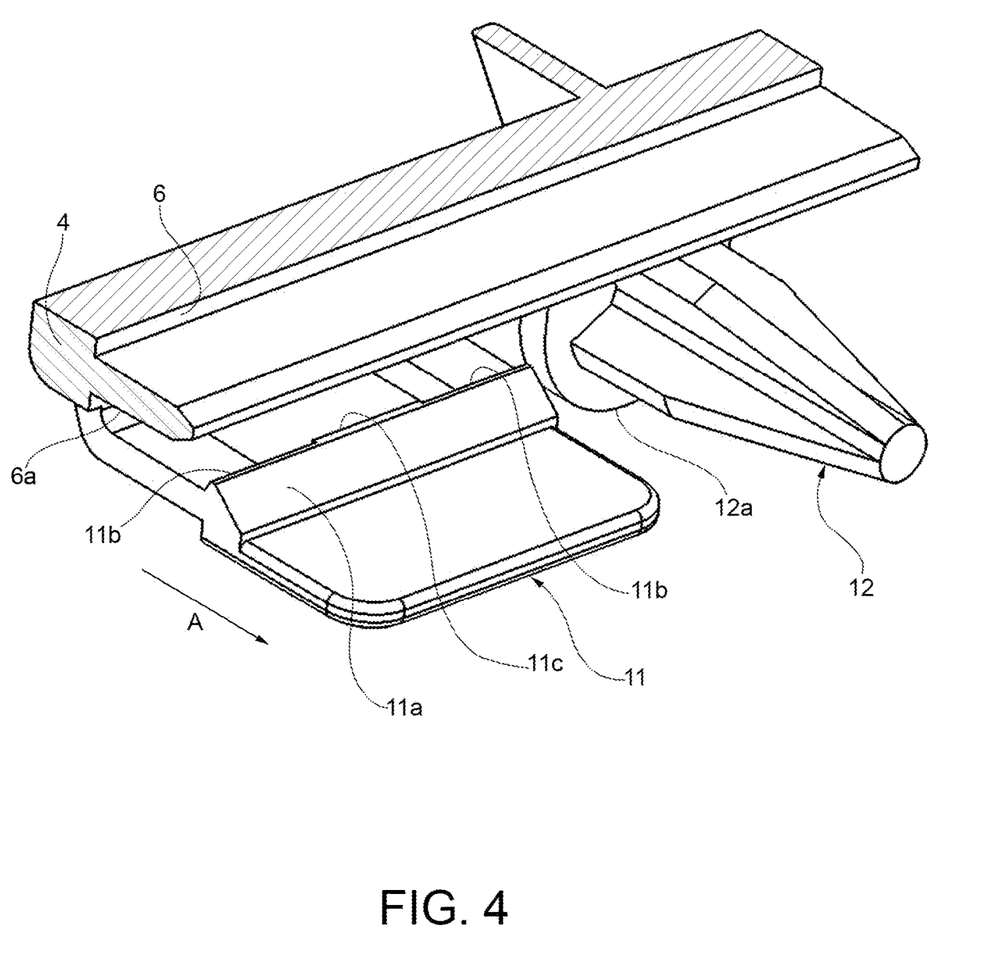
Figure 5:
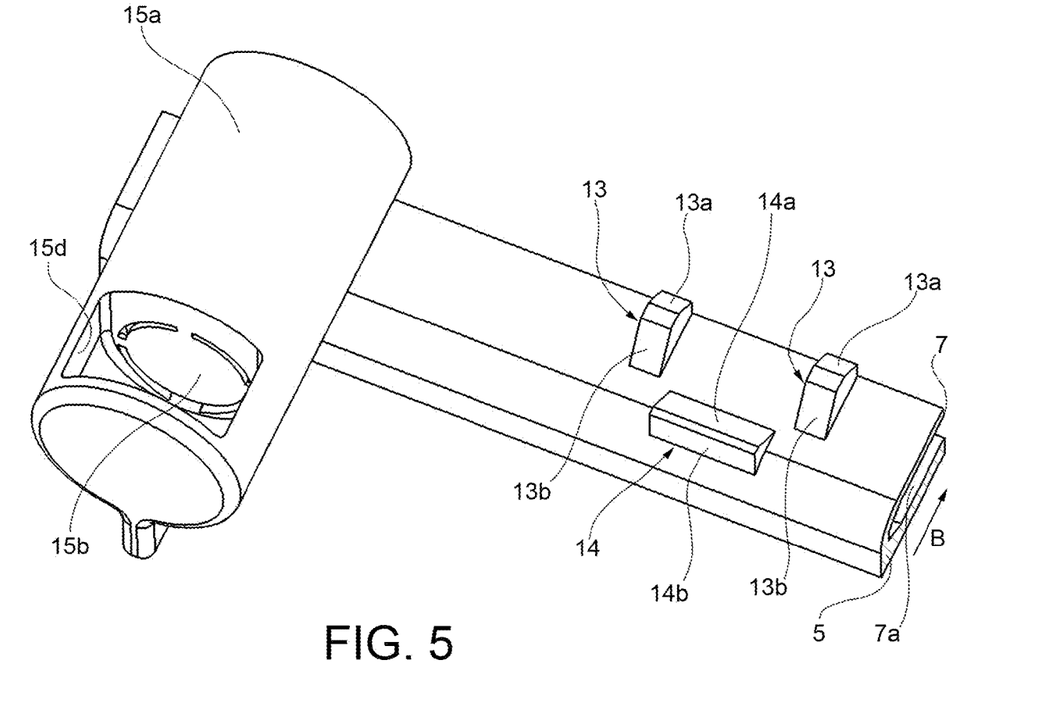
FIGS. 5 and 6 are a perspective view and a plan view, respectively, of a second part of the device according to the present invention.
Figure 6:
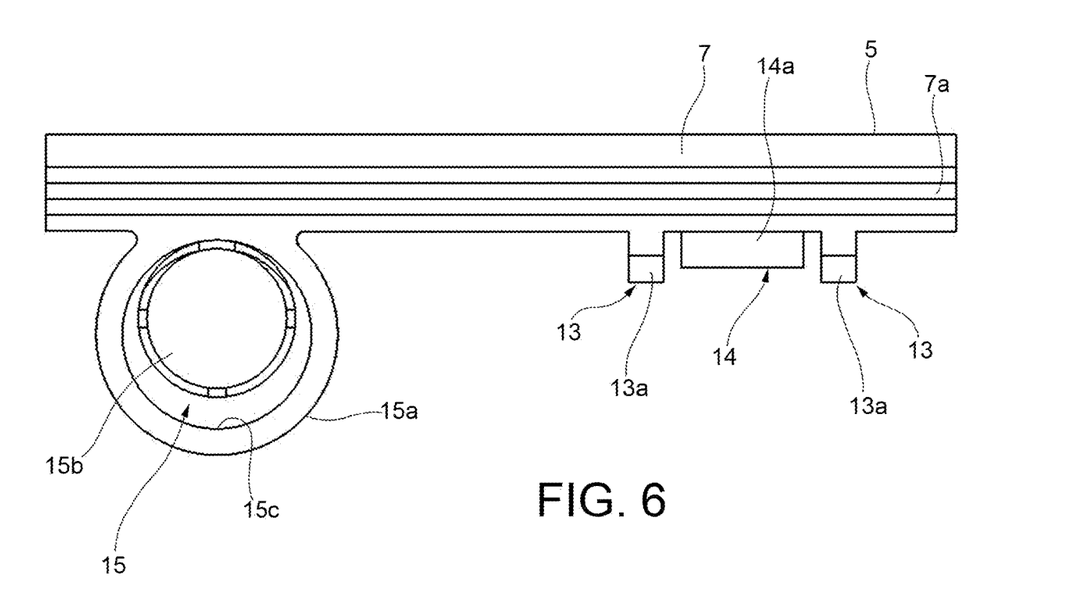

Reference is made to FIG. 1 which shows a housing 1, in particular a housing for a vehicle air-conditioning unit, as an exemplary application of a connection device according to the present invention.

The housing 1 comprises two assembled components or half-housings 2 and 3 made of plastics material. The two components 2, 3 comprise walls 4 and 5, respectively, hereinafter referred to as the first wall and the second wall which form one wall of the housing 1 when the components are assembled.

The first wall 4 and the second wall 5 comprise respective front edges 6 and 7 that, when the two components 2, 3 are assembled, are arranged one against the other.

The two components 2, 3 are held together by a connection device 10, which is illustrated more clearly in FIGS. 2 to 10.

These figures also show a portion of the walls 4 and 5 near the respective edges 6 and 7. As can be seen in FIGS. 2 to 10, the edges 6 and 7 of the first wall 4 and of the second wall 5 have a labyrinth shape. One of the edges 6 and 7 comprises at least one projection or tab 6a, while the other comprises at least one recess or groove 7a designed to receive the projection 6a when the two components 2 and 3 are assembled.

The device 10 comprises at least one clip 11 that may be formed in one piece with the first wall 4. The clip 11 is arranged on a lateral face of the first wall 4 and extends beyond the edge of the first wall 4, that is towards the second wall 5, when the two components 2 and 3 are assembled. The clip 11 is formed as a resilient tab shaped to bend with respect to the first wall 4. An inclined invite surface 11a, which faces forwards with respect to the assembly direction of the two components 2 and 3 (indicated by the arrow A in FIGS. 3 and 4) is formed on the side of the clip that faces the first wall 4. At least one first inclined locking surface 11b (two locking surfaces in the example) and one second locking surface 11c are formed on the side of the clip facing the first wall 4, the locking surfaces facing backwards with respect to the assembly direction A of the two components 2 and 3. The second locking surface 11c is substantially orthogonal to the plane defined by the first wall 4, or in any case comprises a greater inclination with respect to the first locking surface(s) 11b. The locking surfaces 11b and 11c are arranged in different positions in a direction that is orthogonal to the assembly direction A of the two components 2 and 3.

The device 10 may also comprise at least one centering pin 12 that may be formed as a single piece with the first wall 4. The centering pin 12 is formed by a projection 12a arranged on a lateral face of the first wall 4 and extending beyond the edge of the first wall 4, that is towards the second wall 5 when the two components 2 and 3 are assembled.

The device 10 also comprises at least one first tooth 13 (two first teeth in the example) and at least one second tooth 14 that may be formed as a single piece with the second wall 5. The teeth 13 and 14 are arranged on a lateral face of the second wall 5 and are designed to be snap engaged by the clip 11. The first tooth 13 comprises an inclined invite face 13a that faces forwards with respect to the assembly direction of the two components 2 and 3, which is indicated by the arrow B in FIG. 5. It should be noted that the direction of the arrows A and B should be understood in a relative sense and does not necessarily indicate an actual direction of movement during the assembly of the components. Instead, the direction of each arrow A and B indicates the side on which the piece shown in the single figure is arranged facing the other piece during the assembly of the two pieces.

The first tooth 13 also comprises an inclined locking face 13b that faces backwards with respect to the assembly direction B of the two components 2 and 3. The second tooth 14 comprises an inclined invite face 14a that faces forwards with respect to the assembly direction B, and a locking face 14b that faces backwards with respect to the assembly direction B. The locking face 14b of the second tooth 14 is substantially orthogonal to the plane defined by the second wall 5 or in any case has a greater inclination with respect to the locking face 13b of the first tooth 13, or even has an inverted inclination with respect thereto.

The first tooth 13 is closer than the second tooth 14 to the edge 7 of the second wall 5. Furthermore, the first tooth 13 and the second tooth 14 are offset with respect to the assembly direction B.

The device 10 may also comprise at least one centering seat 15 that may be formed as a single piece with the second wall 5. The centering seat 15 is made in a can 15a arranged on a lateral face of the second wall 5 and is designed to receive the centering pin 12.

The centering seat 15 comprises a frangible bottom 15b that defines an abutment position of the centering pin 12 during a step of assembling the two components 2 and 3, and is designed to be broken by the centering pin 12 in another assembly step.

According to a plan view (FIG. 6), the bottom 15b of the centering seat 15 is arranged eccentrically with respect to an inlet portion 15c of the centering seat 15.

The assembly of the components 2 and 3 with the above-described connection device is carried out as follows.

Two freshly molded components 2, 3 which are still relatively hot and susceptible to deformation as a result of shrinkage during cooling are provided.

Figure 7:
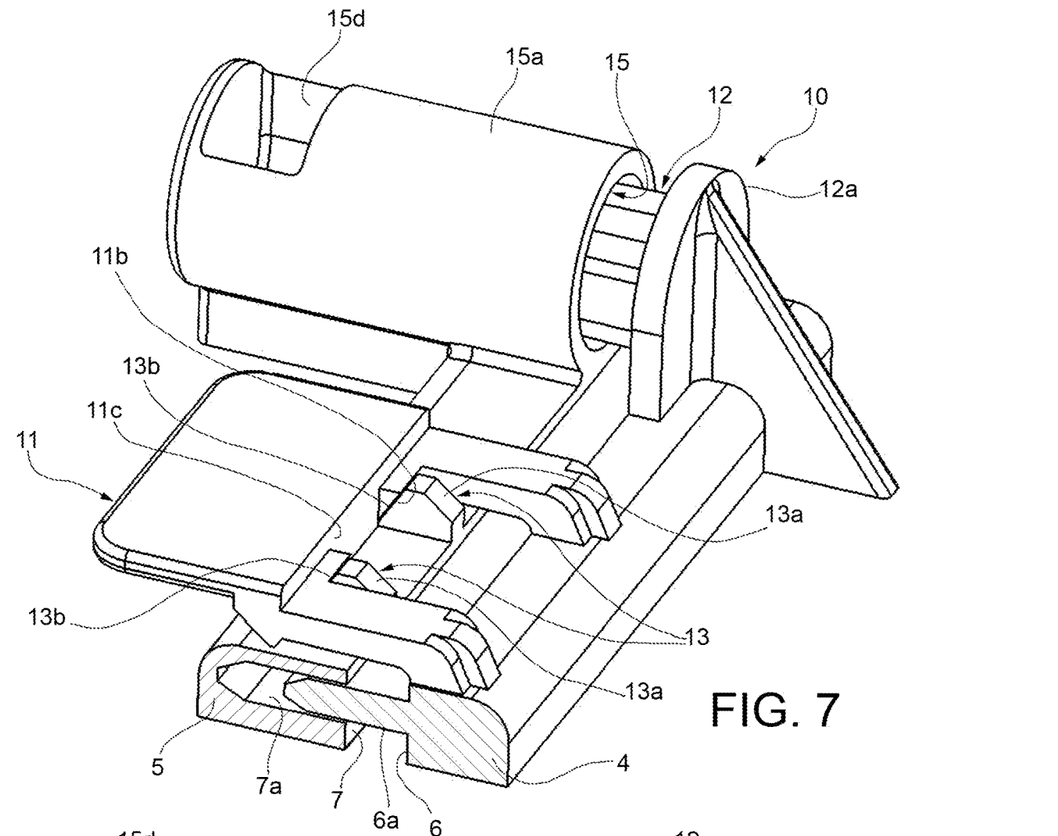
FIGS. 7 and 8 are a perspective view and a laterally elevated view, respectively, of the connection device, in which the components are pre-assembled.
Figure 8:
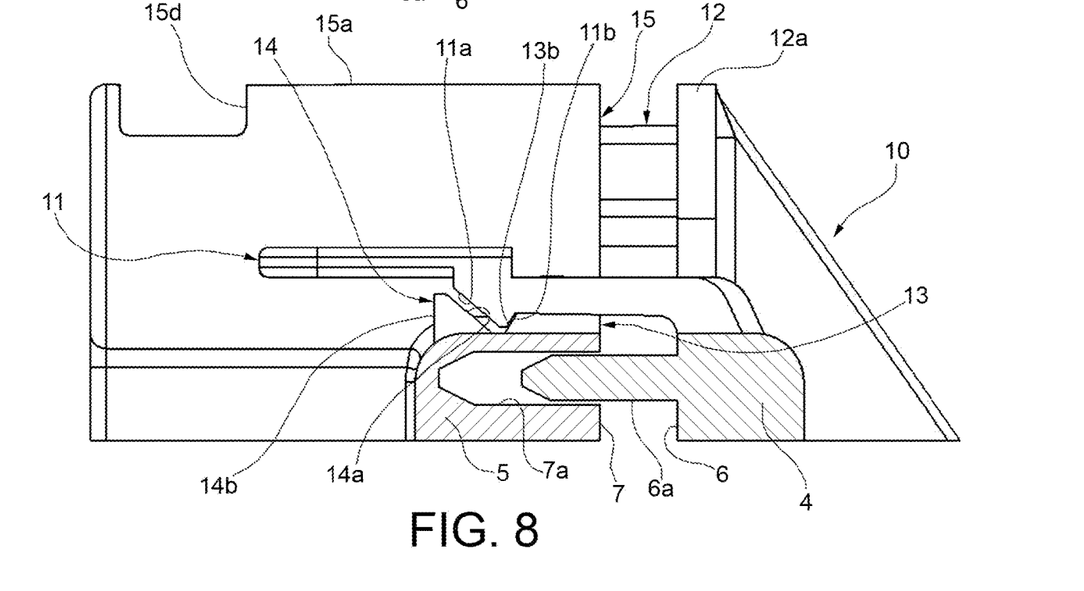

In a pre-assembled state, the clip 11 engages with the first teeth 13 and the two components 2, 3 are connected to one another by the edges 6 and 7 of the first wall 4 and of the second wall 5, respectively, the edges being spaced apart from one another (FIGS. 7 and 8). The pre-assembly procedure may be carried out manually and provides that the two components are brought closer to one another so as to cause bending of the clip 11 as a result of the invite faces 13a of the first teeth 13 and of the invite surface 11a of the clip 11, and its springback into the rest position once the first teeth 13 have been passed. At the same time, the centering pin 12 is inserted into the centering seat 15, and the tip of the centering pin 12 stops against the bottom 15b of the centering seat 15. The centering ensured by the pin 12 and by the particular seat 15 makes it possible to correctly pre-couple edges 6 and 7, which are in the shape of a labyrinth, of the walls 4 and 5, by inserting the projection 6a into the recess 7a. The centering pin 12 reaching the bottom wall 15b provides the operator with confirmation that the pre-assembled state has been reached.

After waiting for the components to cool down to prevent further significant shrinkage, it is possible to separate the two components 2, 3, for example manually, in order to carry out additional work. In the event that the two components are part of a housing, additional elements may be mounted on the two components.

Decoupling is facilitated by the reduced incline of the locking faces 13b of the first teeth 13 and of the locking faces 11b of the clip 11, which makes it possible to achieve the opening of the clip 11 by applying a force (tensile force) in the opposite direction to that which was applied to pre-assemble the components.

Figures 9, 10:
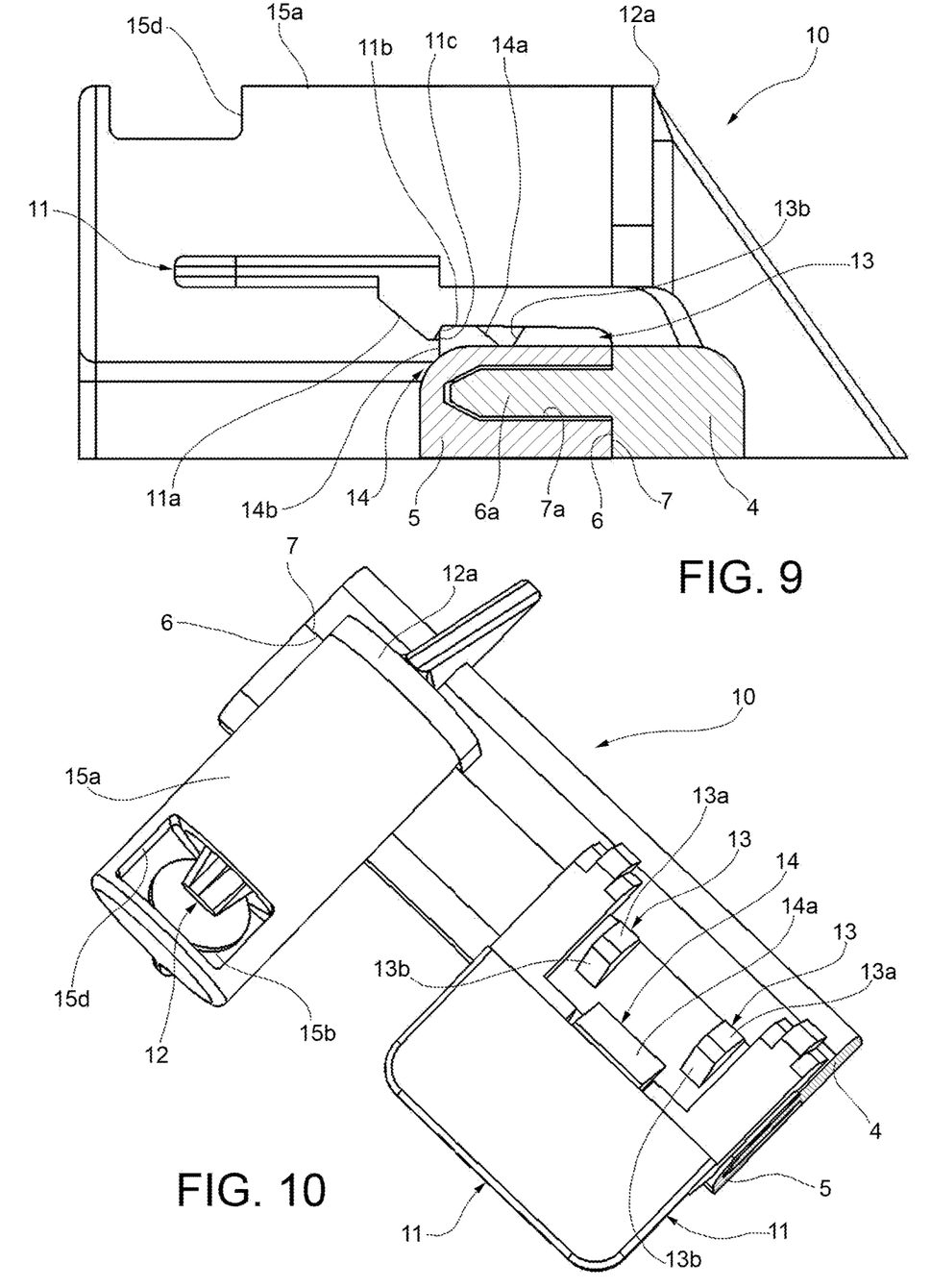
FIGS. 9 and 10 are a laterally elevated view and a perspective view, respectively, of the connection device, in which the components are assembled.

Once the additional work required by specific applications has been carried out, the two components are interconnected in the final assembled state, shown in FIGS. 1, 9 and 10. This procedure may be carried out by a small press.

The two components 2 and 3 are brought closer again. During this movement, the pre-assembled state is first passed, then the clip 11 bends as a result of the invite face 14a of the second tooth 14 and of the invite surface 11b of the clip 11 and springs back to the rest position once the second tooth 14 has been passed. At the same time, the centering pin 12 is inserted into the centering seat 15, and the tip of the centering pin 12 breaks through the bottom wall 15b of the centering seat 15. Windows 15d may be obtained in the can 15a in which the centering seat 15 is formed, to allow an operator to have visual confirmation that the assembled state has been reached. The bottom wall 15b can be connected to the can 15a such that, once it has been broken through, said wall bends without being fully detached from the can 15a.

The present invention is not intended to be limited to the embodiments described and illustrated herein Various modifications in terms of shape, arrangement of parts, design details and function, may be made without departing from the scope of protection, as described and claimed herein.

What is claimed is:

1. A connection device interconnecting two components made of plastics material, said two components comprising a first wall and a second wall, respectively, the first wall and the second wall having respective edges that, when the two components are assembled, are arranged one against the other, wherein said connection device comprises:
at least one clip arranged on the first wall and extending beyond the edge of the first wall;
at least one first tooth and at least one second tooth arranged on the second wall and designed to be snap engaged by the at least one clip when the two components are in a pre-assembled state and in an assembled state, respectively, said at least one first tooth being closer than the at least one second tooth to the edge of the second wall such that, when pre-assembled, the two components are connected to one another by the edges of the first wall and of the second wall, said edges being spaced apart from one another, and said at least one first tooth having an inclined locking face for facilitating decoupling of the two components from the pre-assembled state, said inclined locking face facing towards the at least one second tooth; and
at least one centering pin arranged on one of said first wall and said second wall and extending beyond the edge thereof, and at least one centering seat arranged on the other of said first wall and said second wall and designed to receive the at least one centering pin, wherein said at least one centering seat comprises a cylindrical sidewall and a frangible bottom wall which is broken through by the at least one centering pin when the two components are brought closer to one another than the two components are in the pre-assembled state, a plurality of perforations defined between a periphery of the bottom wall and the sidewall to enable the bottom wall to be broken away from the sidewall.

2. The connection device of claim 1, wherein the frangible bottom wall of the at least one centering seat defines an abutment position for the at least one centering pin when the two components are in the pre-assembled state.

3. The connection device of claim 1, wherein, when viewed from above, the frangible bottom wall of the at least one centering seat is arranged eccentrically with respect to an entrance portion of the at least one centering seat.

4. The connection device of claim 1, wherein the at least one first tooth and the at least one second tooth are offset relative to an assembly direction of the two components, and the at least one clip is provided with a plurality of surfaces having different profiles designed to engage with the at least one first tooth and the at least one second tooth, respectively.

5. The connection device of claim 1, wherein the edge of one of said first wall and said second wall is provided with at least one projection, and the edge of the other of said first wall and said second wall is provided with at least one recess designed to receive said projection when the two components are assembled.

6. The connection device of claim 1, wherein the at least one clip, the at least one first tooth and the at least one second tooth, the at least one centering pin and the at least one centering seat are arranged on lateral faces of the first wall or of the second wall.

7. A method for assembling two components made of plastics material, the two components comprising a first wall and a second wall, respectively, the first wall and the second wall having respective edges that, when the two components are assembled, are arranged one against the other, the two components being provided with a connection device, comprising:

at least one clip arranged on the first wall and extending beyond the edge of the first wall;

at least one first tooth and at least one second tooth arranged on the second wall and designed to be snap engaged by the at least one clip when the two components are in a pre-assembled state and in an assembled state, respectively, said at least one first tooth being closer than the at least one second tooth to the edge of the second wall such that, when pre-assembled, the two components are connected to one another by the edges of the first wall and of the second wall, said edges being spaced apart from one another, and said at least one first tooth having an inclined locking face for facilitating decoupling of the two components from the pre-assembled state, said inclined locking face facing towards the at least one second tooth; and at least one centering pin arranged on one of said first wall and said second wall and extending beyond the edge thereof, and at least one centering seat arranged on the other of said first wall and said second wall and designed to receive the at least one centering pin, wherein said at least one centering seat comprises a cylindrical sidewall and a frangible bottom wall which is broken through by the at least one centering pin when the two components are brought closer to one another than the two components are in the pre-assembled state, a plurality of perforations defined between a periphery of the bottom wall and the sidewall to enable the bottom wall to be broken away from the sidewall, the method comprising:

providing the two components, connecting the two components to one another in the pre-assembled state, allowing the two components to cool, separating the two components, performing further work on at least one of the two components, and connecting the two components to one another in the assembled state.

\* \* \* \* \*